April 8, 1924.
L. N. HAMPTON
DIAPHRAGM
Original Filed Feb. 21, 1920
1,489,349
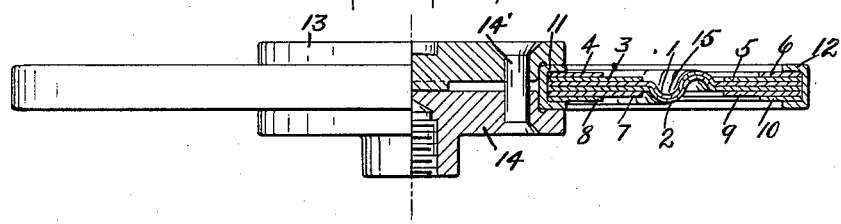
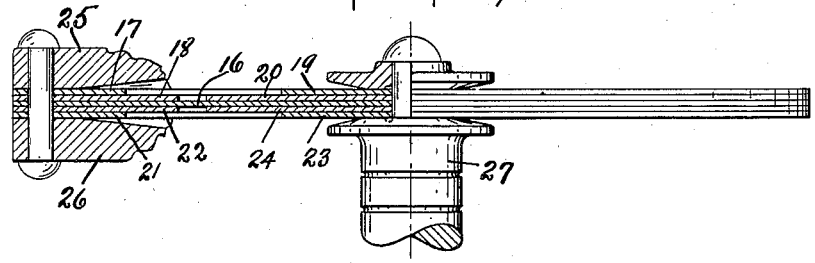
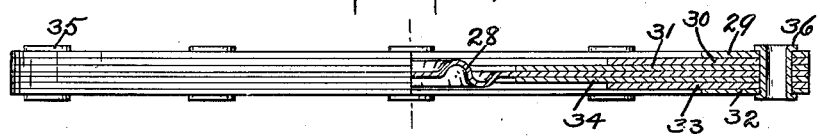
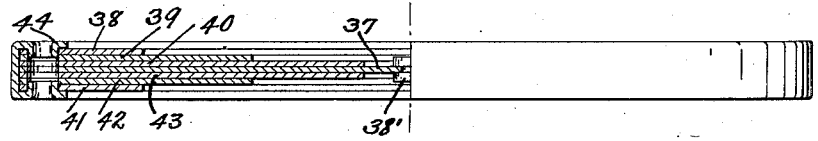
INVENTOR
Leon N. Hampton
BY
Kiddle & Margeson.
ATTORNEYS Patented Apr. 8, 1924.

1,489,349

UNITED STATES PATENT OFFICE.

LEON N. HAMPTON, OF NEW YORK, N. Y.

DIAPHRAGM.

Original application filed February 21, 1920, Serial No. 360,303. Divided and this application filed October 28, 1920. Serial No. 420,326.

*To all whom it may concern:*

Be it known that I, LEON N. HAMPTON, a citizen of the United States, and a resident of Bronx County, in the city and State of New York, have invented certain new and useful Improvements in Diaphragms, of which the following is a specification.

This invention relates to an improvement in diaphragms and is a division of my co-pending application Serial No. 360,303, filed February 21, 1920, on an improvement in fluid-transfer devices.

In order that my invention may be clearly understood and in order that the advantages of my improved structure may be appreciated I will first of all discuss more or less briefly the theory of the action of diaphragms in general, pointing out the difficulties which have been experienced in attempting to provide a diaphragm which will stand up under the duties for which it has been designed and which at the same time will be simple in construction.

Flexible diaphragms are, by nature of their function, subjected to repetitive stresses upon loading. A stress often repeated will cause most materials to assume a crystalline structure and its cohesive powers are much deteriorated. This loss of strength by crystallization is commonly called fatigue of materials and is usually the cause of rupture in flexible diaphragms.

Such diaphragms are usually loaded on one side at least by a uniform load, either singly applied or in connection with a concentrated one. It is obvious, therefore, that diaphragms are directly subjected to simple stresses as tension, compression and shear, but these stresses are usually so small as compared to the flexural unit-stress that they rarely need to be considered.

Loading of diaphragms is usually repeated often and the stress usually covers a great range and due to reverse flexure, these stresses alternate from tension into compression and back again. In general, diaphragms are acted upon by static loads, but are, however, sometimes stressed by a sudden load.

While rupture of a material may be caused by repeated applications of a unit stress less than its ultimate strength, it is also true that the greater the range in stress, the less is the unit-stress required to cause rupture in a given number of applications and that a range in stress from tension into compression and back again will cause rupture with a less number of applications than the same range in stress of one kind only. It is also true that both the stress and deformation produced by a sudden load are greater than those caused by a static load. It is obvious, therefore, that the service to which diaphragms are subjected is severe and great care must be exercised in their design.

There apparently is no sensible relation between the unit-stress and the number of applications necessary to rupture a diaphragm as the number of applications increases far more rapidly than the stress decreases. If the unit-stress varies from zero up to but not exceeding the elastic limit, an enormous number of applications is required to cause rupture, on the other hand if the stress alternates and the range of stress in tension is equal to that in compression, the unit-stress that produces rupture after an enormous number of applications is a little greater than one-half the elastic limit.

When a diaphragm is subjected to the action of loads, the horizontal fibres on one side of its neutral axis are elongated and those on the other side are shortened. The diaphragm, therefore, bends and all points except those at the stationary clamping rim deflect from their original position and if the elastic limit of the material is not exceeded, its neutral surface assumes its elastic curve.

The flexural unit-stress at any point in a diaphragm of uniform cross section is proportional to the bending moment at that point and hence varies throughout the diaphragm in the same way the moments vary. Accordingly, some parts of such a diaphragm are but slightly stressed in comparison with the dangerous sections. The dangerous sections in such a diaphragm occur at the clamping rims of the rigid sections or points of concentrated loads and it is obvious that if these sections are of sufficient area to keep the unit-stress within them well below the natural elastic limit, there will be too much material at other points in the diaphragm because of the fact that the cross section is maintained constant throughout. Further, the rigidity of the diaphragm will be increased so much that the deflection under the load will be far less than is required in general practice, To obtain the required flexibility in the common form of uniform-section-disk diaphragm the weight of the material must then be reduced. The stress at the dangerous points is, therefore, very high and for this reason these diaphragms soon crystallize and break in service.

A diaphragm of such a section as will give it uniform strength in bending, that is to say one in which the unit stress is substantially constant throughout the flexible portion of the diaphragm as compared to a diaphragm which is substantially uniform in cross section is the most efficient, not only because of the advantages offered by a constant unit-stress throughout the diaphragm, but also because a given load will deflect such a diaphragm much more than it would one of uniform section in which the same unit stress is not exceeded. It must be remembered, however, in making diaphragms of uniform strength in bending that sufficient sectional area must be provided at the thinner portions to carry the vertical shear, and that the method of creating a section of uniform strength greatly influences the life of the diaphragm as will be brought out hereinafter.

Diaphragms have been constructed by shaping, as by grinding, a disk of uniform section to a disk of approximately uniform strength. Where grinding is resorted to the surface of the disk is destroyed and fracture along the scratch lines is enhanced. Further, since the elongation or shortening of any fibre in a diaphragm for a given deflection is directly proportional to its distance from the neutral surface of the diaphragm and the stresses in these fibres are proportional to their changes in length within the elastic limit, the horizontal stresses are directly proportional to the distances from the neutral surface, and the diaphragm being of a homogeneous mass and surface fibres being located at varying distances from the neutral surface in an increasing ratio from the point of minimum flexural stress to the maximum at the clamping rims, there will be considerable distortion within the diaphragm. In such a diaphragm when reversely flexed all of the stresses alternate from tension into compression and back again throughout the entire mass at every vibration and as previously brought out, this is a condition which will promote crystallization. In the manufacture of such a diaphragm, extreme care must be exercised therefore and the best of material and expensive fixtures used.

The object of my invention is to provide an improved inexpensive and efficient method of producing diaphragms which are of uniform strength in bending in order to prevent their crystallization by fatigue while in service.

My conception of such a diaphragm provides for a built-up laminated structure, each lamination being free and distinct from those adjacent it at all portions throughout the working area, the number of laminations and their disposition varying to meet the requirements of loading.

It will be brought out in the description of specific modifications of such a diaphragm that the members of the working area, with the exception of the so-called control laminations, need not be stressed alternately in tension and compression and back again even though the diaphragm may be vibrated either side of normal and also that the material distortion may be kept at a minimum. It will be recognized from the foregoing that such conditions tend towards long life and the constructions described will point out practical methods of accomplishment.

In the accompanying drawings—

Fig. 1 shows in part section elevation a preferred embodiment of my invention;

Figs. 2, 3 and 4 are modified forms.

Referring to Fig. 1 first of all, 1 and 2 designate what I shall hereinafter refer to as corrugated control or sealing disks. On the upper side of these disks I provide coplanial annuli or laminations 3, 4 and 5, 6, while on the under side I provide similar annuli or laminations 7, 8 and 9, 10. The laminations and control disks are clamped in clamping rims 11 and 12, which are spun over their edges or peripheries, the laminations being built up from the clamping rims in cantilever form as viewed in section. The control or sealing disks it will be observed are continuous from one clamping rim to the other.

At the center of my improved diaphragm I provide a pair of disks 13 and 14 clamped to the clamping rim 11 by rivets 14', these disks constituting a substantially rigid central area.

It will be obvious that when the diaphragm is deflecting downwardly by a uniform pressure, for example, the laminations 7, 8 and 9, 10 will be active and they should therefore, in connection with the control disks 1 and 2 be of such proportions as to make the diaphragm of uniform strength in bending in this direction. Upon reversal of flexure these laminations will become inactive upon regaining their normal positions, and the laminations 3, 4 and 5, 6 will become active. These too therefore should in connection with the control disks be of such proportions as to make the diaphragm of uniform strength in this direction. Under certain conditions of loading the lamination on one side of the control disk at the center and the lamination on the other side of the control disk at its periphery might act at one time. It follows therefore that only the control disks 1 and 2 are subjected to stresses alternating from tension into compression, and by the use of a sufficient number of disks or annuli each disk may be made thin enough to reduce distortion within itself to a minimum. Inasmuch as the total thickness of these disks need be only sufficient to resist vertical shear at the exposed area 15, which can be corrugated as I have shown should increased deflection be desired, it is obvious that even the fibres most remote from the neutral surface will suffer but little distortion or stress and hence the life of the diaphragm will be prolonged.

The laminations or annuli 3, 4, 5, 6, 7, 8, 9 and 10 will also suffer but slight distortion as they are free to slide upon each other in addition to being thin and therefore although the sectional area builds up towards the clamping rims in no instance are the fibres of any lamination far remote from its neutral surface and consequently they are not highly stressed. Furthermore, as the laminations on one side of the control or sealing disks are active in only one direction of flexure of the control disks and the laminations on the other side are active only upon the flexure of the control disks in the opposite direction, these laminations will be subjected to a range of stress in one kind only and will long endure.

Since a diaphragm is essentially a working member it will be obvious that by providing the substantially rigid central area already referred to, the duty imposed upon the flexible portion of the diaphragm will be decreased, and hence the life of the diaphragm will be prolonged. It will of course be apparent also that the flexible portion of the diaphragm is the difference between the entire diaphragm and the rigid portion thereof, and therefore the rigid portion in a diaphragm of a given size must be increased or decreased to obtain the desired flexibility.

The embodiment of my invention as illustrated in Fig. 2 is similar in general to that shown in Fig. 1 and comprises a control or sealing disk 16 and annular laminations or annuli 17, 18 and 19, 20 on the upper side of the control disk and similar laminations 21, 22 and 23, 24 on the under side of the control disk. As in the construction of Fig. 1 these laminations are in cantilever form when viewed in section and are slidable relatively to each other. This diaphragm is not a unitary structure in the sense of Fig. 1, the laminations 17, 18 and 21, 22, together with the control disk 16 being held in place by the members 25 and 26 of the apparatus with which the diaphragm is to be used. The laminations or annuli 19, 20 and 23, 24 are held to the control disk by the member 27 which may be a plunger for example or some other device which is to move with the diaphragm.

Fig. 3 illustrates a diaphragm similar to Fig. 1 in that it is a unitary device. Here I provide a control or sealing disk 28 provided with laminations 29, 30, 31 at the upper side thereof and similar laminations 32, 33, 34 at the under side thereof. In this embodiment of my invention the laminations at the central portion of the control disk have been omitted. The laminations 29 to 34 inclusive are held to the control disk 28 by members 35 and 36, so that the diaphragm is a unitary device. In this device the laminations are movable relatively to each other and to the control disk and these laminations slide upon each other when the device is in use.

In Fig. 4 I have provided a diaphragm comprising a control disk 37 having a rigid central area 38'. On the upper side of this disk are annular laminations 38, 39 and 40 built up in cantilever form as viewed in section. At the under side of the control disk 37 I provide similar laminations or annuli 41, 42 and 43, also built up in cantilever form. The control or sealing disk and laminations are clamped in a clamping rim 44. In this embodiment of my invention as in all the others the laminations are movable relatively to each other and in use each lamination slides relatively to the other.

From the foregoing it will be seen that I have provided a diaphragm of substantially uniform strength in bending as compared to a diaphragm substantially uniform in cross section, and one which is simple in construction and inherently long-lived. While I have illustrated and described certain details of construction it will be understood that various changes may be made therein within the purview of my invention.

What I claim is:

1. A unitary diaphragm comprising a control or sealing disk with an annular disk adjacent its peripheral portion the disks being secured to each other by a clamping member spun over the peripheries or edges of the disk.

2. In a diaphragm an annular shaped control disk provided with an annulus at its peripheral and central portions clamped to the control disk by members spun over the inner and outer circumferential edges.

3. In a diaphragm, a laminated flexural portion comprising a control or sealing disk, a lamination at its central portion, an annulus at its peripheral portion, means for clamping said annulus to the sealing disk and a substantially rigid member at the central portion of the diaphragm.

4. In a diaphragm provided with a substantially rigid member at its central portion, an annular shaped sealing disk and co-planial annuli adjacent the central and peripheral portions thereof.

5. As an article of manufacture, a diaphragm comprising a control disk, a lamination at each side of and adjacent the periphery of said disk and a lamination on each side of said control disk adjacent its central portion.

6. A diaphragm comprising a control disk, a lamination at each side of said disk adjacent the periphery of the disk, a lamination at each side of said disk adjacent the central portion thereof, and clamping rims for clamping the disk and laminations together.

7. As an article of manufacture, a diaphragm comprising a continuous control disk, a disk at the center of the control disk at each side thereof and clamped to the same, and a peripheral ring-shaped or perforated disk at each side of the control disk and clamped thereto, and spaced from the periphery of the second-named disks.

8. A diaphragm comprising a corrugated annular control disk with an annulus on each side of its peripheral portion, means for clamping the edges of these annuli to the sealing disk, an annulus on each side of and adjacent the central portion of the sealing disks and means for clamping the edges of these second-named annuli to the sealing disk, and a substantially rigid member at the central portion of the diaphragm.

This specification signed this 27th day of October, 1920.

LEON N. HAMPTON.